(12) United States Patent
Gibbons et al.

(10) Patent No.: US 8,166,860 B2
(45) Date of Patent: May 1, 2012

(54) SYSTEM FOR FORMING A MITER JOINT

(75) Inventors: Louis Gibbons, Stevensville, MD (US); Gregory S. Snider, Bel Air, MD (US); Frederick R. Bean, Finksburg, MD (US); Terry L. Turner, Towson, MD (US); Steven McClaskey, Baltimore, MD (US); Robert H. Gifford, New Freedom, PA (US)

(73) Assignee: Black and Decker, Towson, MD (US)

( * ) Notice: Subject to any disclaimer, the term of this patent is extended or adjusted under 35 U.S.C. 154(b) by 0 days.

(21) Appl. No.: 12/848,427

(22) Filed: Aug. 2, 2010

(65) Prior Publication Data
US 2010/0294100 A1 Nov. 25, 2010

Related U.S. Application Data

(63) Continuation of application No. 11/779,035, filed on Jul. 17, 2007, now abandoned.

(51) Int. Cl.
*B23D 45/14* (2006.01)
*B23D 45/04* (2006.01)
*B23D 47/04* (2006.01)

(52) U.S. Cl. ..... 83/473; 83/522.26; 83/477.2; 83/468.3; 33/537

(58) Field of Classification Search ............ 83/473, 83/13, 409, 409.1, 416, 477.1, 435.1, 477.2, 83/437, 471.3, 467.1, 468.3, 522.25, 522.17, 83/490, 522.26, 522.11; 33/455, 534, 471, 33/27.03, 500, 452, 453, 456, 465, 469, 474, 33/479, 418, 49, 427, 27.02, 385, 400

See application file for complete search history.

(56) References Cited

U.S. PATENT DOCUMENTS

| | | |
|---|---|---|
| 0,060,646 A | 12/1866 | Snyder |
| 0,456,105 A | 7/1891 | Adams |
| 0,521,414 A | 6/1894 | Langlais |
| 0,541,514 A | 6/1895 | Walker |
| 0,678,005 A | 7/1901 | Myers |
| 0,684,367 A | 10/1901 | Green |
| 0,797,453 A | 8/1905 | Nagel |
| 0,821,374 A | 5/1906 | Parks |
| 956,356 A * | 4/1910 | Humbert ................. 33/455 |
| 1,048,319 A | 12/1912 | Knights |
| 1,454,782 A | 5/1923 | Wimmer |
| 1,791,221 A * | 2/1931 | Murray .................. 33/455 |
| 2,801,652 A | 8/1957 | Meeker, Sr. |
| 2,894,543 A | 7/1959 | Ivy |
| 3,209,798 A * | 10/1965 | Coleman ................. 83/485 |
| 3,498,345 A | 3/1970 | Sexton |
| 3,709,266 A | 1/1973 | Fusco |
| 4,328,728 A | 5/1982 | Ferdinand et al. |
| 4,378,716 A | 4/1983 | Volk |

(Continued)

*Primary Examiner* — Ghassem Alie
(74) *Attorney, Agent, or Firm* — Edell, Shapiro & Finnan, LLC

(57) ABSTRACT

The present invention is directed toward a system for forming miter joints including a miter saw and an angle gauge. The miter saw includes a platform with a kerf slot and a pair of arcuate slots. Each arcuate slot includes an associated rail located on the underside of the platform. A fence is coupled to each of the rails such that the fence may be pivoted with respect to the platform. The angle measurement tool is a one-handed tool including spring loaded paddles that measure the angle between intersecting surfaces. The angle measurement tool connects to the miter saw to permit the transfer of the measured angle to the fences.

23 Claims, 14 Drawing Sheets

U.S. PATENT DOCUMENTS

| | | | |
|---|---|---|---|
| 5,220,857 A | | 6/1993 | Freeburger |
| 5,461,798 A | * | 10/1995 | Ribeiro .......................... 33/562 |
| 5,473,821 A | | 12/1995 | DiMarco |
| 5,737,990 A | | 4/1998 | Freeland et al. |
| 5,865,079 A | * | 2/1999 | Itzov .......................... 83/471.3 |
| 6,076,270 A | | 6/2000 | Figliuzzi |
| 6,477,782 B1 | | 11/2002 | Howe |
| 6,530,302 B1 | | 3/2003 | Rogers |
| 6,604,294 B1 | | 8/2003 | Farley |
| 6,766,583 B2 | | 7/2004 | Economaki |
| 6,877,238 B2 | | 4/2005 | Kanaga |
| 7,886,452 B1 | * | 2/2011 | Russo .......................... 33/455 |

\* cited by examiner

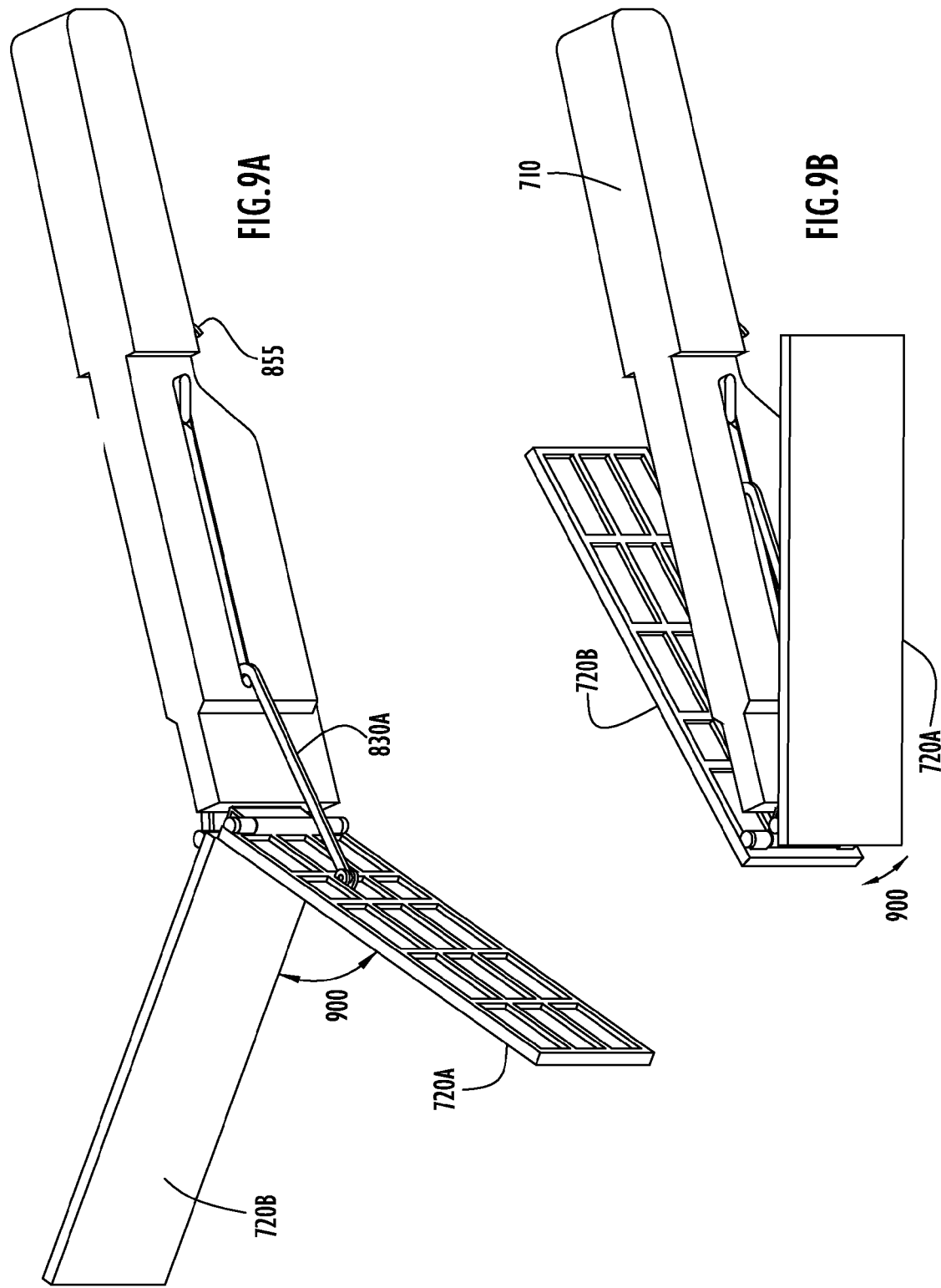

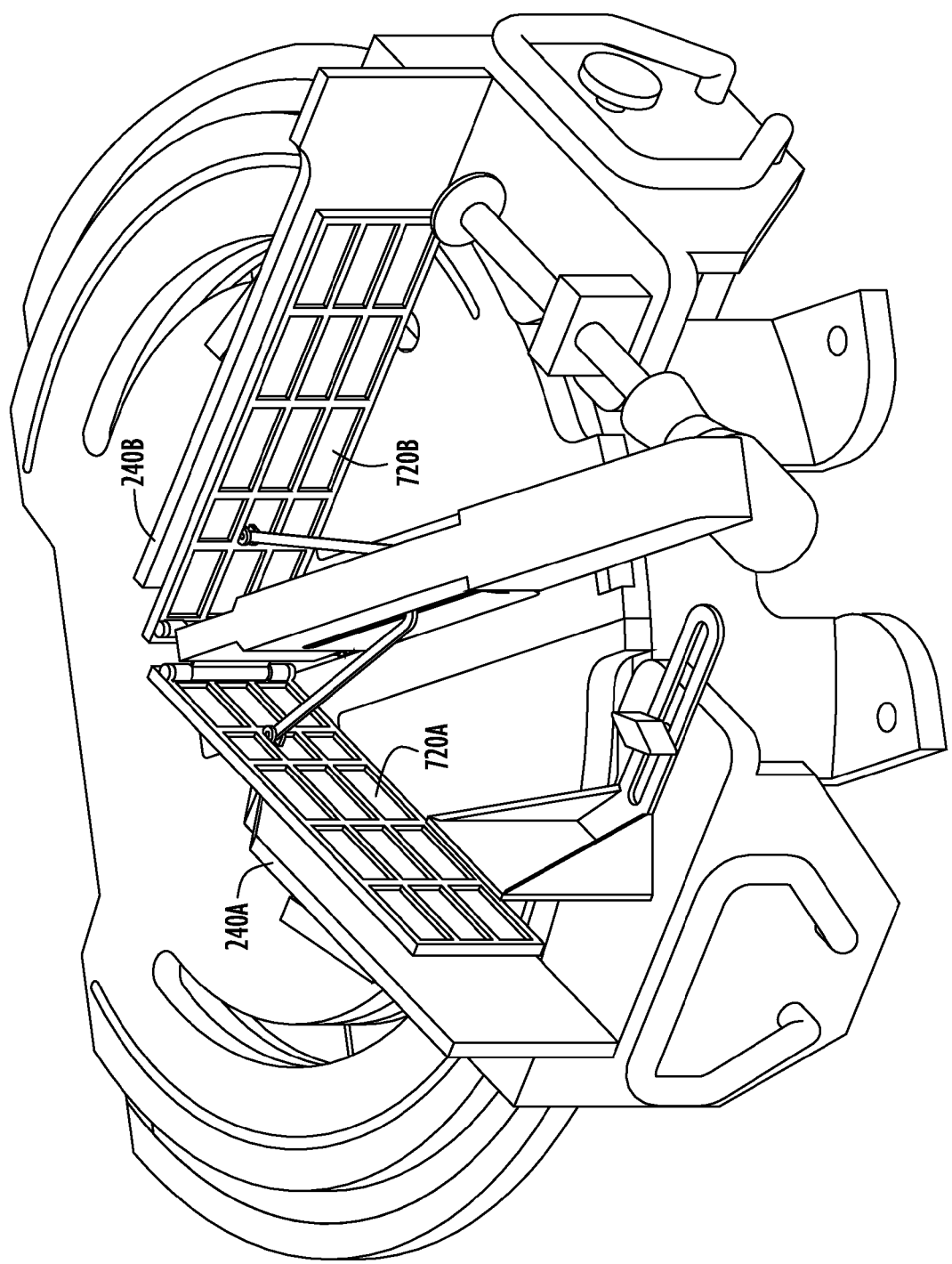

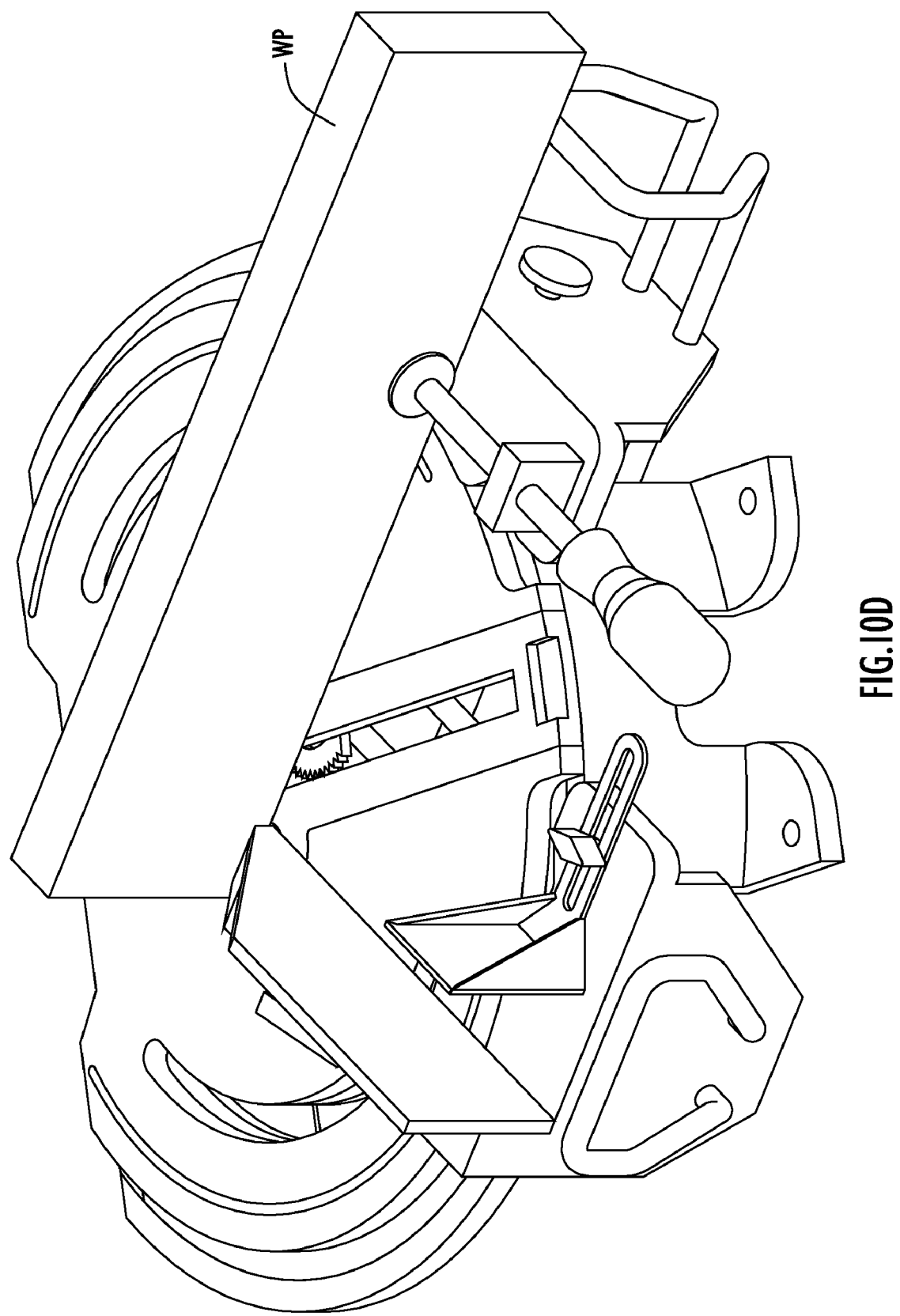

SYSTEM FOR FORMING A MITER JOINT

CROSS REFERENCE TO RELATED APPLICATIONS

This application is a continuation of U.S. application Ser. No. 11/779,035; filed Jun. 17, 2007 and entitled "System for Forming a Miter Joint," which is a nonprovisional of U.S. Provisional Application No. 60/822,707; filed Aug. 17, 2006 and entitled "System for forming a Miter Joint." The disclosure of each application is hereby incorporated by reference in its entirety.

FIELD OF THE INVENTION

This invention relates to a system for forming a miter joint, and, in particular, to a system including a base station and an angle measurement tool operable to measure the angle between intersecting surfaces and then transfer the direct measurement to the base station.

BACKGROUND OF THE INVENTION

Carpenters are often required to join pieces of material (i.e. wood, composites, etc.) at a corner. When joining the pieces of material, the contacting ends of the pieces must be mitered in order to match the angle of the corner and produce an aesthetically pleasing joint. The first step needed to create a proper corner joint is to measure the angle between the converging surfaces. Once the angle is known, the measured angle is bisected and the carpenter's mitering tools are set to the value of the bisected angle. Both converging pieces of material are then cut to the bisected angle. When joined, the pieces of material meet at an angle equal to the measured angle, creating a proper corner joint.

When corners meet at a right (90°) angle, the mitering process is relatively simple. Corners that require miter joints, however, are rarely a perfect right angle. A nominal 'right angle' can, in practice, vary by several degrees on either side of the accepted right angle. When pieces of material must be joined at an acute or obtuse angle, the task of creating a proper corner joint becomes much more complex. For example, a pair of walls may converge at 88.5° at a ceiling, 90.3° midway between ceiling and floor, and 91.6° at the floor. These varying angles must be accurately and quickly measured, and the measurement must then be accurately and quickly transferred to a mitering tool (such as a miter saw).

Traditionally, mitered joints are created using a mitering tool such as a miter saw (also called a chop saw or drop saw). A miter saw makes cuts by pulling or pivoting a spinning circular saw blade down onto a workpiece of material in a short, controlled, chopping motion. The workpiece is typically held against a fence, which provides a standard cutting angle between the blade and the longest workpiece edge. Typically, the standard cutting angle of the fence is fixed at 90°. A primary feature of a miter saw is the miter index, which allows the angle of the saw blade to be changed relative to the fence (i.e., the blade can be rotated left to right to set it at an angle with respect to the fence). While many miter saws enable one-degree incremental changes to the miter index, many also provide "stops" that allow the miter index to be quickly set to common angles (such as 15°, 30°, or 45°). A compound feature (i.e., a compound miter saw) further allows the angle of the cutting blade to be changed relative to the horizontal plane. Thus, the blade can be angled left or right (called the miter angle); in addition, the blade can be tilted side to side (called the bevel angle), which allows the saw to be used for bevel cutting. Most compound features allow the angle to be set between 0° and 50°, while a less-common "double-bevel" allows the angle to be set between −50° and 50°.

While current miter saws provide an effective means to create miter edge, they are prone to inaccurate measurements. Using the scale on a miter saw to cut miters for imperfect angles can result in poorly fitting corner joints on door frames, window trim, and all types of moldings. This is especially important for large crown moldings, where a small error in angle could translate into a large visible gap between two pieces of material. A miter saw, furthermore, requires a user to take a direct measurement of an angle using, e.g., a protractor or other angle gauge, and then to correlate that measurement with the miter index of the saw, manually adjusting the position of the blade with respect to the fence (and thus the workpiece). Thus, the angle of the crosscut is an indirect measurement, which is prone to inaccurate transfer to the miter saw.

An angle gauge may also be used to transfer the measured angle directly to the workpiece. While the angle defined by the conjoined walls will be accurately captured, error may be introduced when the measurement is transferred to the workpiece. For example, the measurement is transferred by marking the board to be cut with a pencil, and then the cut must be made along the pencil line. The pencil line itself may not accurately reflect the true position of the rules, and the cut along said line may introduce still further error because the operator of the miter saw must visually guide the saw along the pencil line. Errors may result from other sources including making incorrect measurements, incorrectly setting the miter index value, or from differences in scale between the measuring and cutting devices.

Consequently, it is desirable to provide a system wherein the crosscut made into a workpiece is a direct measurement of the corresponding corner. It is further desirable to provide a system that eliminates the step of transferring a measured angle to a workpiece, as well as the step of requiring a craftsman to cut carefully along said angle. A system is also needed that eliminates the step of reading a miter angle setting from a tool and setting the miter saw to the setting.

SUMMARY OF THE INVENTION

The present invention relates to a system and method for measuring a corner angle and then transferring the measurement to a cutting device. The system enables a user to transfer the actual angle of a corner to a miter saw without the additional steps of taking a separate measurement of the angle and/or performing any calculations. Thus, the resulting mitered joint may be cut to match the actual angle of the corner rather than a nominal angle.

Thus, the present invention is directed toward a system forming a miter joint including a measurement tool and a base station. The measurement tool may include a pair of pivoting plates operable to measure acute, obtuse, and 90° angles between intersecting work surfaces such as conjoined walls. The measurement tool is portable, and releasably connects to the base station. The base station may include a cutting device (e.g., a miter/drop saw), a cutting deck, and fences pivotally coupled to the deck. In operation, a user measures a corner angle by placing each plate of the measurement tool against a respective one of the intersecting work surfaces. The measured angle is then transferred to the fences of base station by placing the measurement tool in a predetermined position onto the base station, and then pivoting the fences toward the plates until the fences contact the plates. A fine adjustment mechanism may be engaged to insure proper abutment of the fences with the plates of the measurement tool. The fences are then locked into position, orienting the fences with respect to the blade at a proper miter angle for the measured corner. That is, the miter angle is the actual, measured angle of the corner, and no further adjustment or measurement transfer is required. A workpiece (e.g., crown molding) may then be placed on a fence, oriented in the same manner the workpiece is positioned on the wall. The cutting device may then be utilized to cut the workpiece.

BRIEF DESCRIPTION OF THE DRAWINGS

FIGS. 9A and 9B illustrate perspective views of the angle gauge shown in FIG. 7, showing the movement of the plates from a first position to a second position.

FIGS. 10A-10D illustrate the operation of the system for forming a miter joint shown in FIG. 1.

Like reference numerals have been used to identify like elements throughout this disclosure.

DETAILED DESCRIPTION OF THE INVENTION

Figure 1:
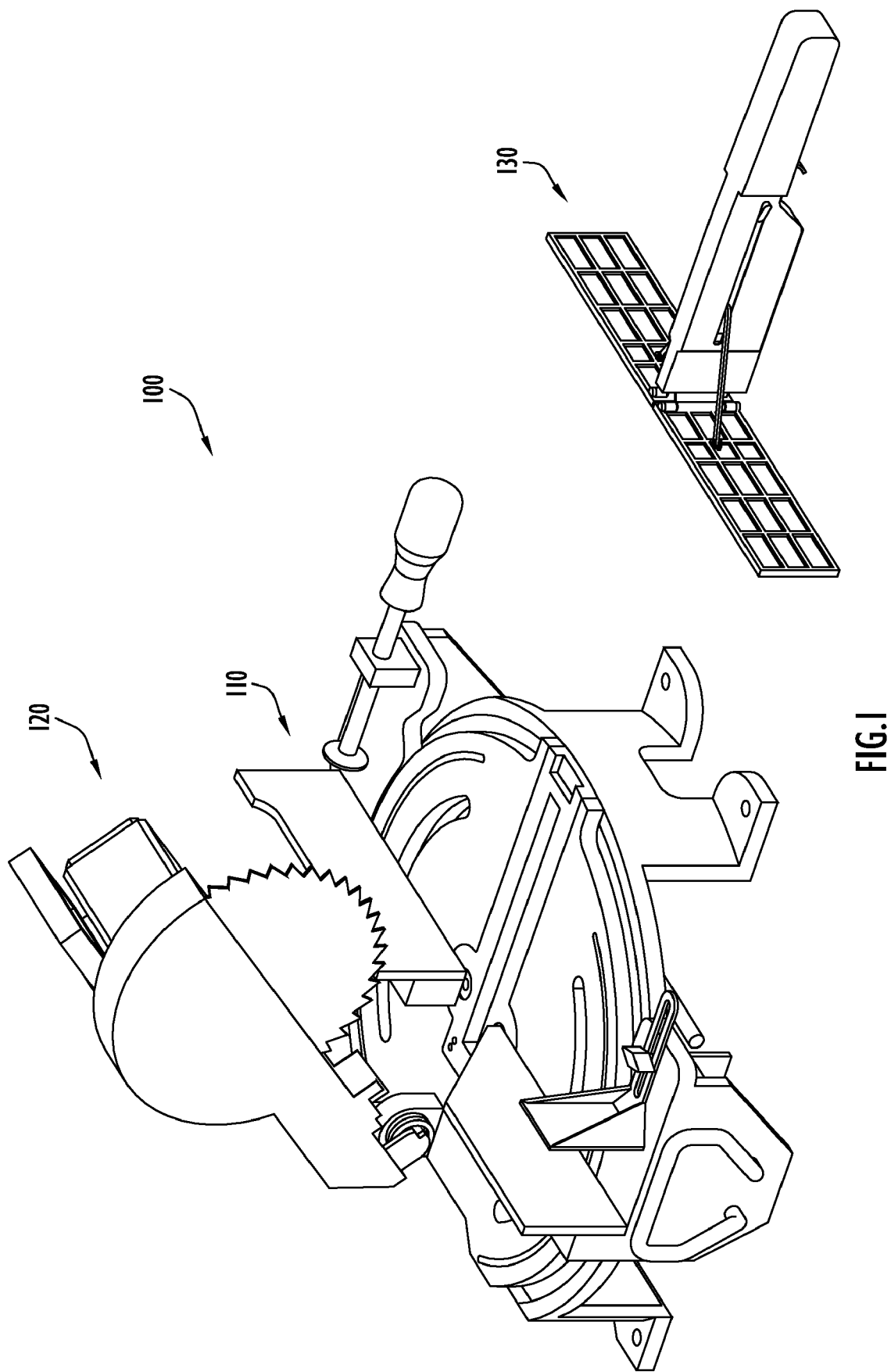
FIG. 1 is a perspective view of the system for forming a miter joint according to an embodiment of the present invention.

FIG. 1 is a perspective view of the system for forming a miter joint in accordance with an embodiment of the present invention. As illustrated, the system for forming a miter joint 100 may include a base station 110 with a cutting device 120, and a measurement tool 130 (also called an angle gauge) that removably couples to the base station.

The cutting device 120 may include any device operable to cut a workpiece WP (e.g., wood, aluminum, crown molding, etc). By way of example, the cutting device 120 may include manual and powered saws including, but not limited to, hand saws, chop saws, drop saws, miter saws, sliding saws, etc. The cutting device 120 may be separate from the base station 110, or may be coupled thereto. In the embodiment shown in FIG. 1, the cutting device 120 is a drop/chop saw (with a rotating circular saw blade) coupled to the base station 110 using fasteners. Typically, the cutting device 120 is fixed to the base station 110 such that the miter angle of the cutting device 120 is held constant at about 90°. Alternatively or in addition to, the cutting device 120 may be adapted to move along a vertical plane so that the bevel angle with respect to the workpiece WP may be adjusted (e.g., the saw may bevel approximately 45°). For this reason, one or both of the sliding fences may possess an angular edge that allows the blade to layover to the bevel maximum without touching the fences (discussed in greater detail below).

Figure 2:
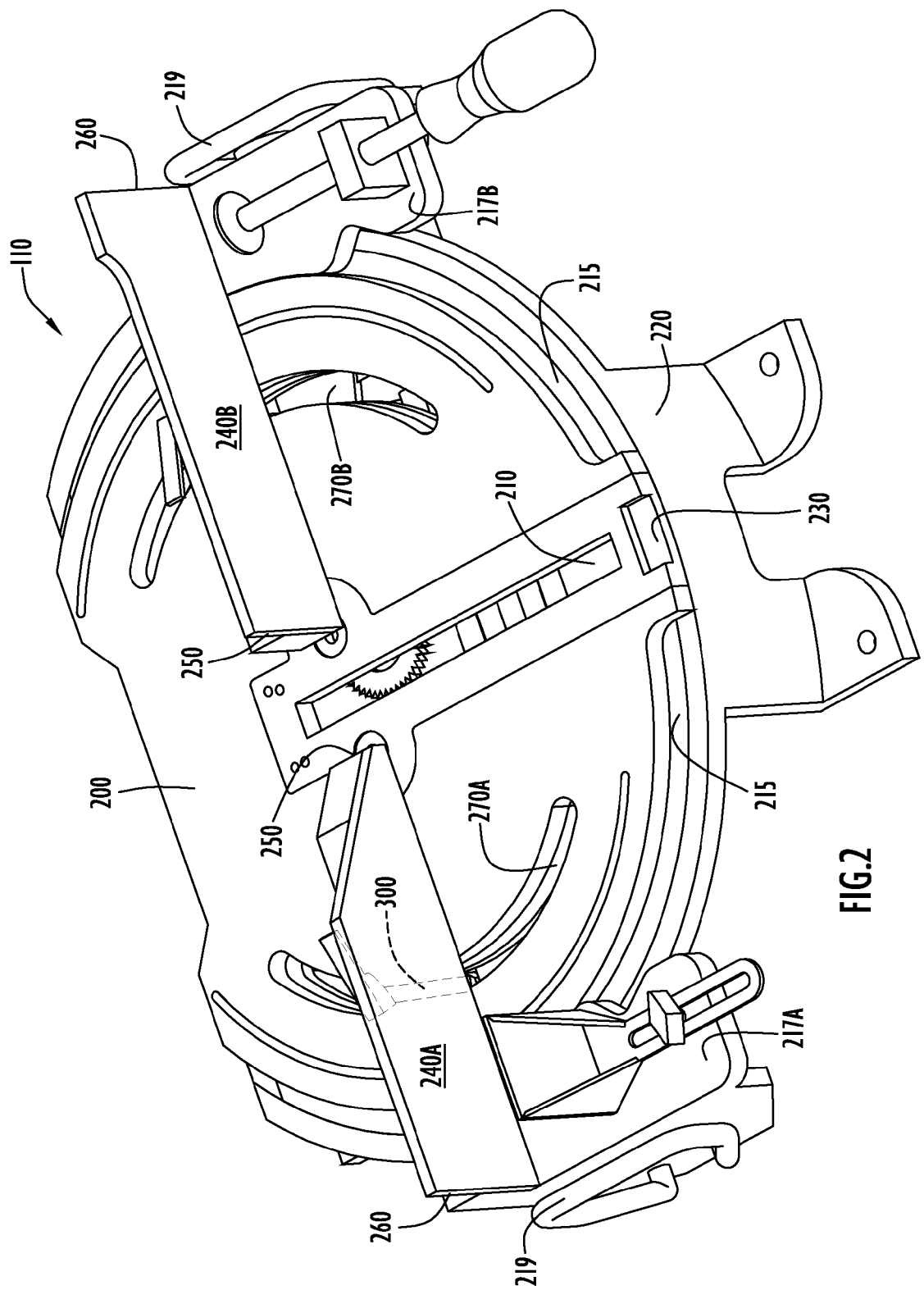
FIG. 2 is a perspective view of the base station shown of FIG. 1 with the cutting tool removed for clarity.

FIG. 2 illustrates the base station of FIG. 1, with the cutting device removed for clarity. The base station 110 includes a cutting deck or platform 200 with a kerf slot or cutting channel 210 formed therein. The kerf slot 210, which receives the blade of the cutting device 120, extends diametrically along the deck 200 to define a cutting area. The kerf slot 210 may be any dimension suitable for its intended purpose (i.e., to provide clearance for saw blades of various dimensions). The deck 200 may also include a groove or guide slot 215 along which a fence support 217A, 217B travels (discussed in greater detail below).

The deck 200 may be configured to stand on a supporting surface such as a table, the floor, the ground, etc. To this end, the deck 200 may include one or more foot members 220 operable to cooperatively support the deck over/on a supporting surface. Each foot member 220 may be formed from any suitable material such as rubber, plastic, wood, metal, etc. The foot members 220 may be integrated into the deck 200, or may be attached to the deck via fasteners such as bolts or screws. The deck 200 may further include a notch 230 that receives a tab or tabs located on the angle gauge 130, securing the angle gauge on the base station 110 and/or guiding the angle gauge into its proper position on the deck 200.

The base station 110 may also be adapted to connect to a miter saw stand in a manner similar to that described in U.S. patent application Ser. No. 11/298,272 (to Snider), entitled "Tool Support Device", the disclosure of which is incorporated herein by reference in its entirety. By way of specific example, the base station 110 may connect to a deck that, in turn, connects to a miter saw stand.

The base station 110 further includes fences to guide a workpiece WP toward the cutting area (and thus the saw) at a desired angle. Specifically, a first fence or block 240A may be oriented on one side of the kerf slot 210, while a second fence or block 240B is oriented on the other side of the kerf slot, opposite the first fence. Each fence 240A, 240B possesses a proximal end 250 (the end closer to the kerf slot 210) and a distal end 260 (the end closer to the perimeter of the deck 200). The proximal end 250 may define a pivot point about which each fence 240A, 240B may pivot. Together, the fences 240A, 240B define an angle that is bisected by the kerf slot 210. The angle between the fences may be altered by pivoting the fences about their respective pivot points (discussed in greater detail below).

As mentioned above, the cutting device 120 may be adapted to move along a vertical plane so that the bevel angle with respect to the workpiece WP may be adjusted. For this reason, one or both of the fences 240A, 240B may possess an angled edge that allows the blade to layover to the bevel maximum without touching the fences. For example, the proximal end 250 of the first fence 240A may slope (angle) downward in the direction of the kerf slot 210 to accommodate the beveling of the cutting device 120.

Each fence 240A, 240B is repositionable along the deck 200 such that each fence pivots about a pivot point. As illustrated in FIG. 2, a pair of arcuate slots or channels 270A, 270B is formed into the deck 200. Specifically, a first arcuate slot 270A is formed on one side of the kerf slot 210 and a second arcuate slot 270B formed on the opposite side of the kerf slot. The arcuate slots 270A, 270B are mirror images of each other, being symmetrically divided by the kerf slot 210. The dimensions of the arcuate slots 270A, 270B is not particularly limited, and may be configured to provide the desired degree of fence pivot.

Each fence 240A, 240B is coupled to the deck 200 such that it moves along its associated arcuate slot 270A, 270B, altering the angle the fence with respect to the kerf slot 210 and, as such, the angle the workpiece WP enters the cutting area. For example, each fence 240A, 240B may be coupled (e.g., connected) to a fence support 217A, 217B, which, in turn, may be coupled to the deck 200 such that it moves along a guide slot 215 formed into the top surface of the deck. Consequently, moving a fence support 217A, 217B along its corresponding guide slot 215 repositions the fence 240A, 240B along the top of the deck 200, moving about its pivot point. Each fence support 217A, 217B may further be coupled to conventional extension members 219 configured to extend outward from the deck, accommodating workpieces WP of various lengths.

Figure 3A:
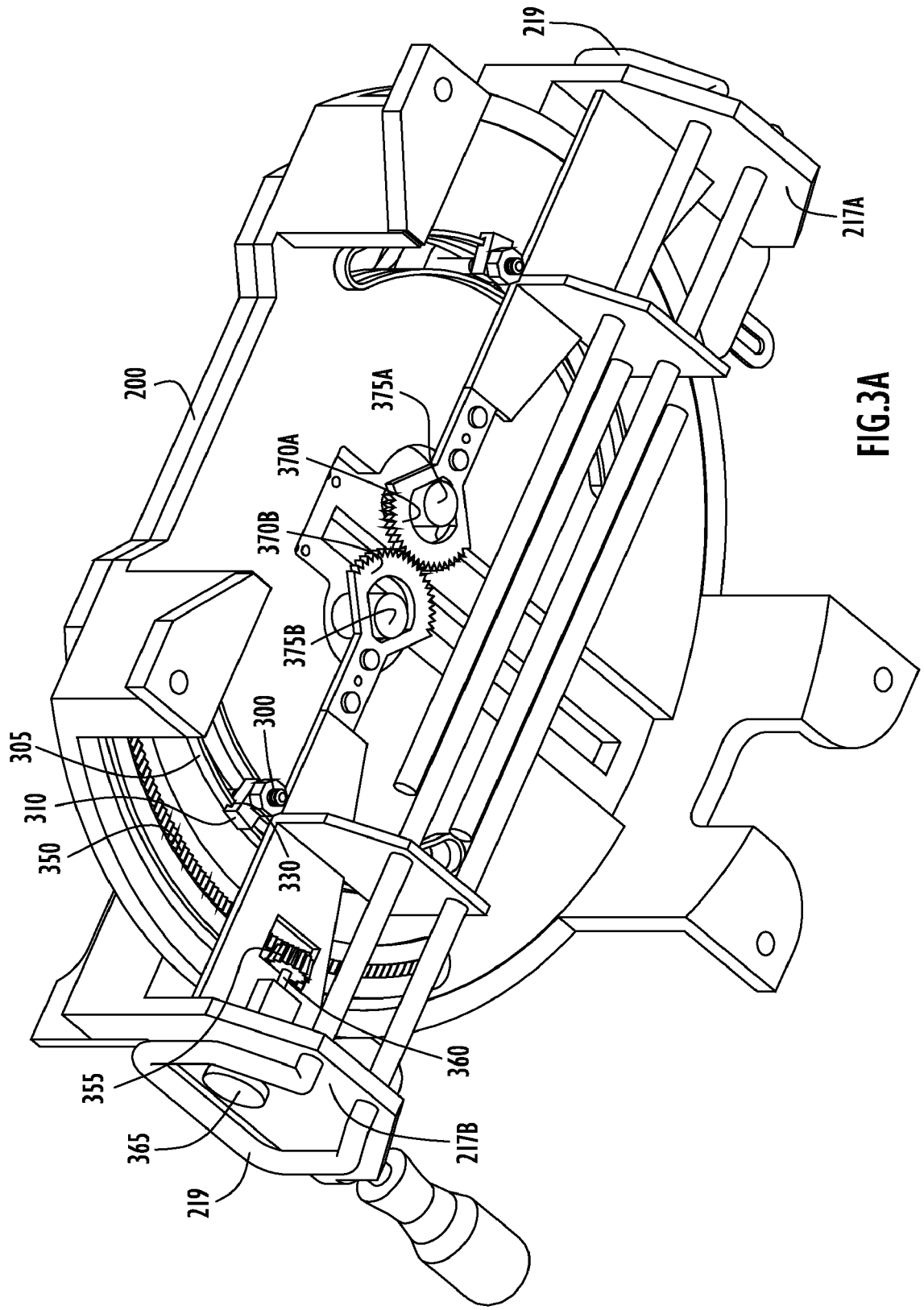
FIG. 3A is a bottom view of the base station of FIG. 2.

The base station 110 may also include a rail mechanism utilized to reposition the fences 240A, 240B along the deck 200. FIG. 3A is a bottom perspective view of the table of FIG. 2. In the embodiment illustrated, a rod 300 extends through each fence 240A, 240B to the underside of the deck 200. A rail or rib 305 (e.g., a generally arcuate rail) is formed into the surface, being substantially coextensive with the arcuate slot 270A, 270B. A shoe 310, coupled to the rod 300, includes a groove 330 that mates with the rail 305. The shoe 310 rides along the rail 305; consequently, applying a force to a fence 240A, 240B drives the fence along the rail, pivoting the fence about a pivot point located, e.g., at the proximal end 250 of the fence.

Figure 4A:
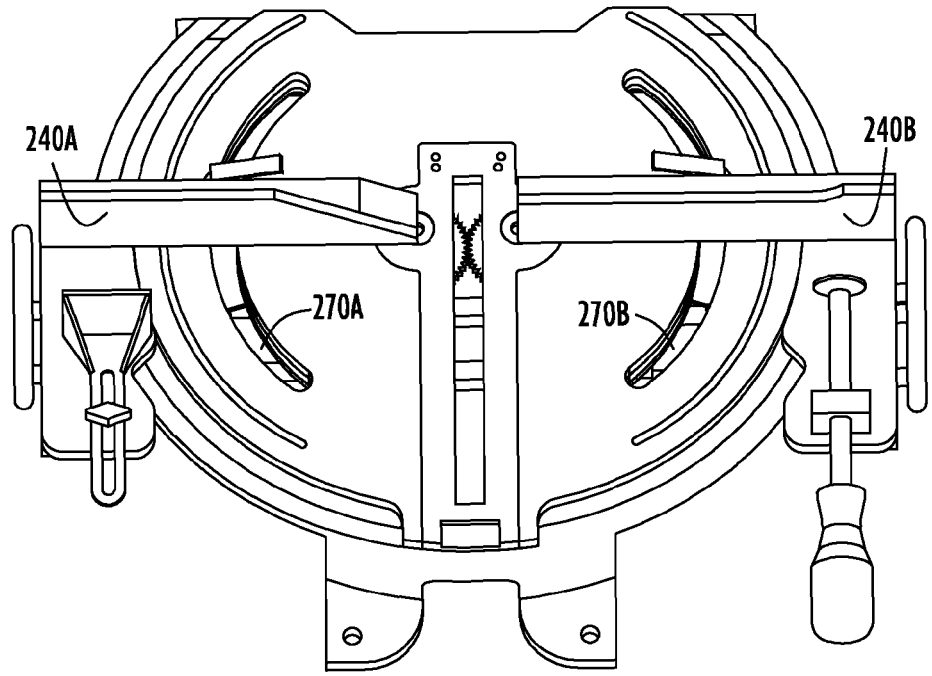
FIGS. 4A and 4B are top views of the base station of FIG. 2, showing displacement of the fences from a first position to a second position.
Figure 4B:
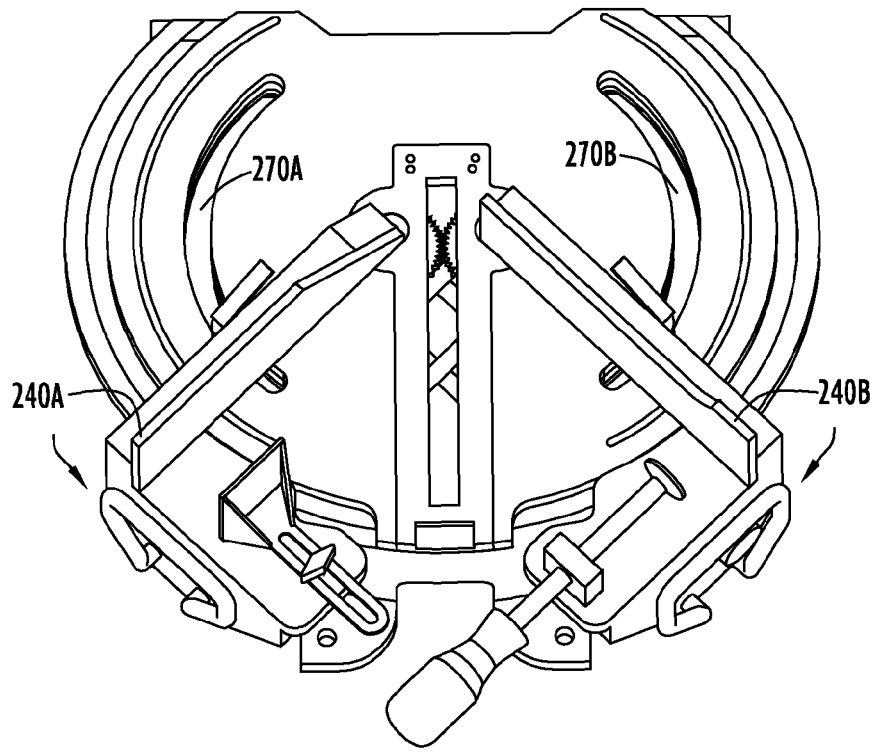

The repositioning of the fences is illustrated is FIGS. 4A and 4B. As illustrated, the fences are moveable from a first fence position (FIG. 4A) to a second fence position (FIG. 4B) (and vice versa) by manually moving the fences (indicated by arrows). Each of the guide slot 215 (on the top surface of the deck) and the rail 305 (on the bottom surface of the deck) may work independently or collectively to pivot each fence 240A, 240B about its proximal end pivot point. The degree of fence pivot may be limited by the dimensions of the arcuate slots 270A, 270B and/or the guide slot 215. By way of example, each fence 240A, 240B may be adapted to pivot approximately 176° through a point that is perpendicular to the kerf slot 210. In other words, the fences 240A, 240B may rotate 88° clockwise and 88° counterclockwise from a normal 0° reference point oriented perpendicular to the drop direction of the blade of the cutting device 120.

Figure 3C:
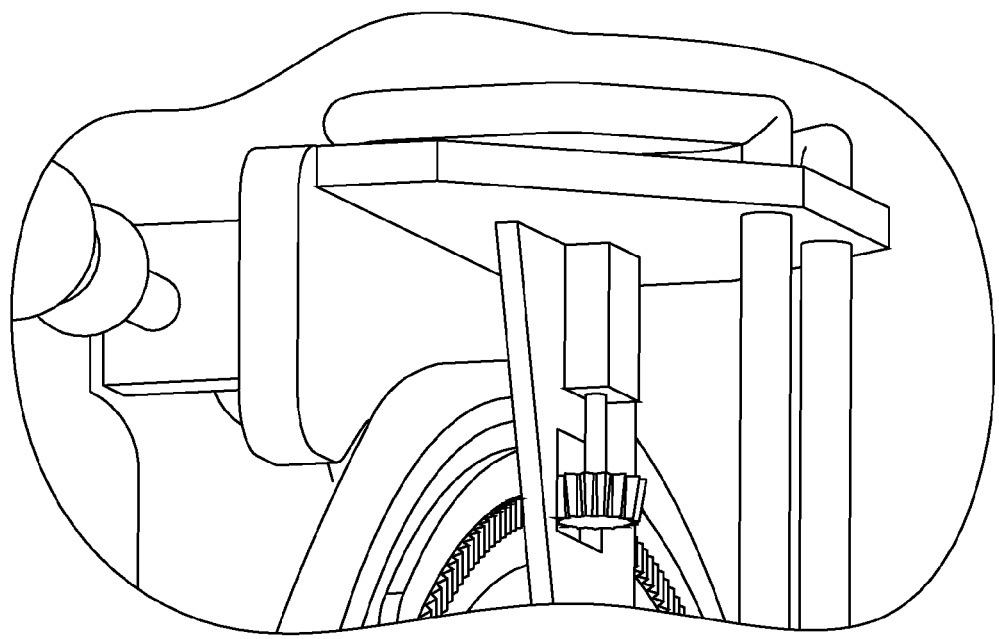
FIGS. 3B and 3C are close-up views of the underside of the base station, showing the fine adjustment mechanism.
Figure 3B:
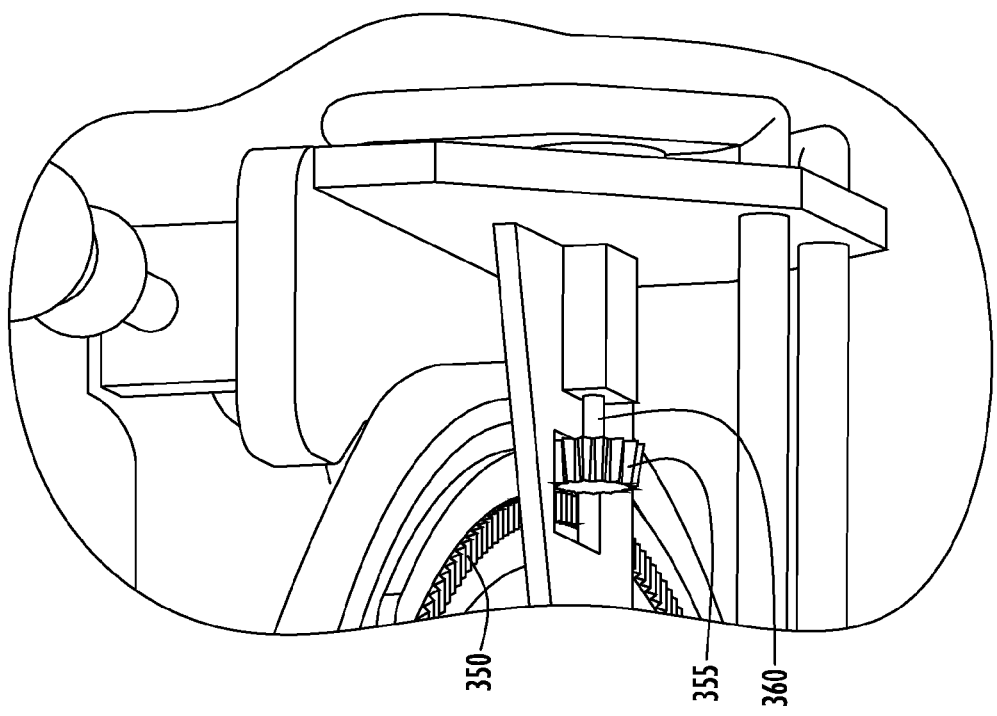

The base station 110 may further include a fine adjustment mechanism operable to incrementally reposition each fence 240A, 240B along the deck 200. Referring back to FIG. 3A, a rack gear 350 may be formed into the bottom surface of the deck 200. A pinion gear 355, in communication with a shaft 360, is coupled to the fence 240A, 240B. The pinion gear 355 meshes with the rack gear 350 such that rotation of the shaft drives the fence 240A, 240B along the rack gear 350, in turn driving the fence along the rail, pivoting it. The fine adjustment mechanism provides incremental (e.g., in increments less than a degree) adjustment of the fences to bring the fences into precise contact with the plates of the angle gauge 130. The operation of the fine adjustment mechanism is explained with reference to FIGS. 3A-3C. A user engages an actuator 365 (e.g., a knob) to translate (push/pull) the pinion gear 355 into engagement (FIG. 3C) and out of engagement (FIG. 3B) with the rack gear 350. Rotating the actuator 360 clockwise or counterclockwise drives the fence as described above, moving the fence along the rail 305.

While the fences 240A, 240B may be configured to pivot independently of each other, in the embodiment illustrated in FIG. 3A, the fences are linked such that movement of the first fence 240A causes a corresponding movement of the second fence 240B, and vice versa. Specifically, a first gear 370A and a second gear 370B having intermeshing teeth are rotatably mounted about their respective axes of rotation 375A, 375B. With this configuration, the, rotation of one gear 370A, 370B effects simultaneous and opposite rotation of the other gear. Thus, the rotation of the first fence 240A is instantaneously communicated to the second fence 240B (or vice versa) with each fence being positioned at the same angle as its counterpart.

Figure 5A:
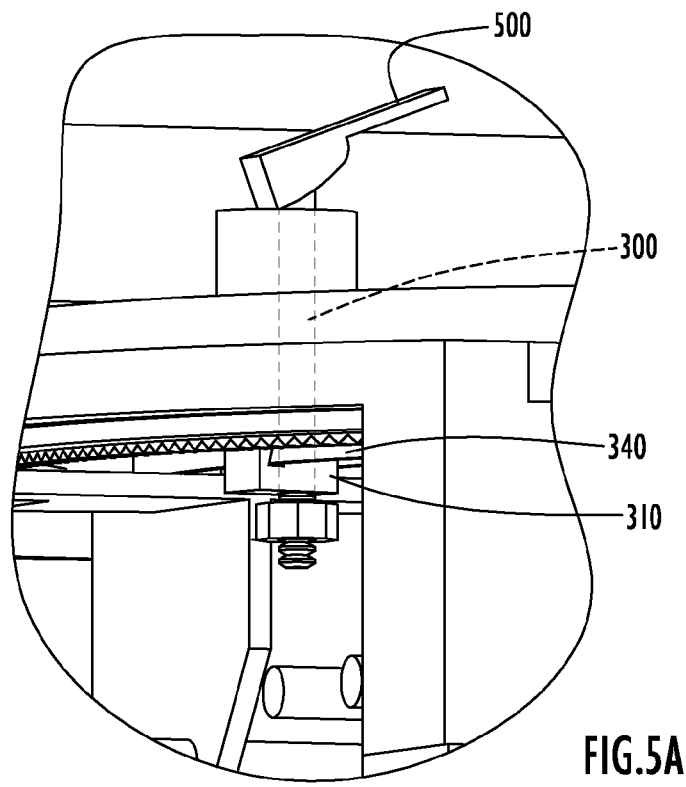
FIGS. 5A and 5B are close-up views of the base station platform, showing the fence lock mechanism.
Figure 5B:
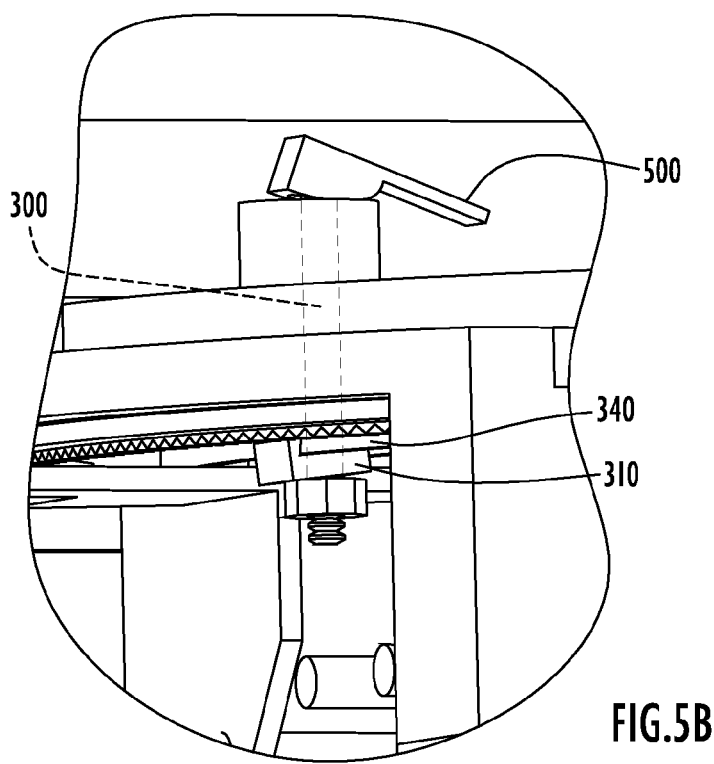

The fences 240A, 240B may also be selectively secured in a desired position to prevent its pivotal motion and lock the fence at a desired angle. For example, a latch or clamp mechanism may be provided that fixes the position of the fence with respect to the deck 200. FIGS. 5A-5B illustrate a clamp in accordance with an embodiment of the invention. A lever 500 (e.g., and over-the-center lever) is pivotally connected to the rod 300. Engaging the lever 500 (e.g., moving the lever from its up (FIG. 5A) position to its down position (FIG. 5B) draws the rod 300 upward from its normal position, pulling the fence 240A, 240B downward against the upper surface of the deck 200 and increasing the friction between the shoe 310 and the rail 305. This secures the fence 240A, 240B on the deck 200, preventing its movement along the rail 305. In this way, when the correct angle has been determined (with the help of the angle gauge 130 and/or fine adjustment mechanism), the fences 240A, 240B can be locked to the deck to stabilize a workpiece WP when it is being acted upon by the saw.

Figure 6A:
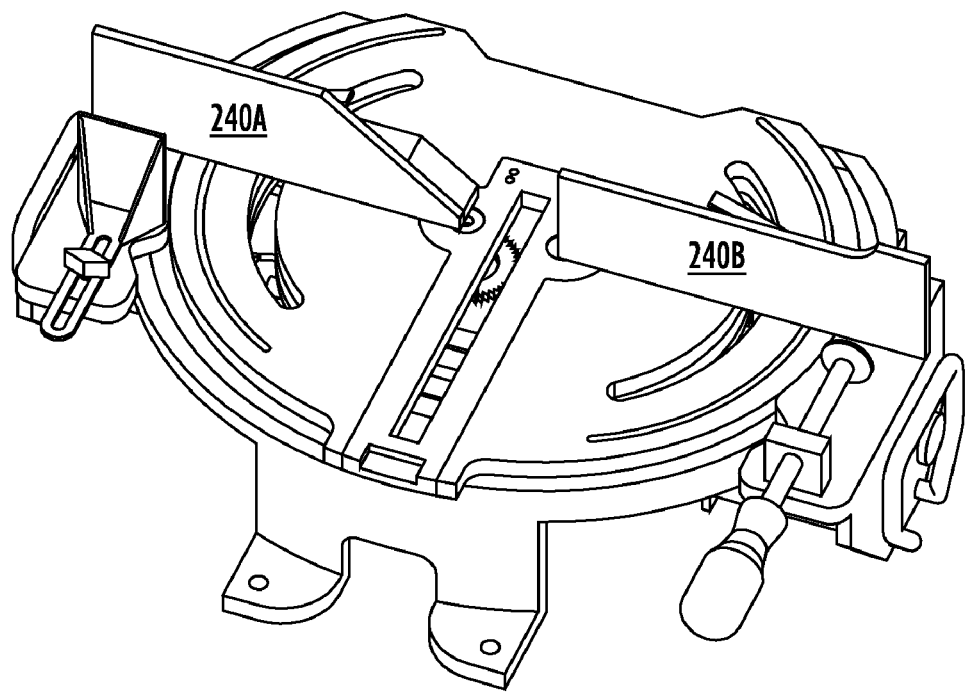
FIGS. 6A and 6B are perspective view of the base station of FIG. 2, showing the extension of the fences from a first position to a second position.
Figure 6B:
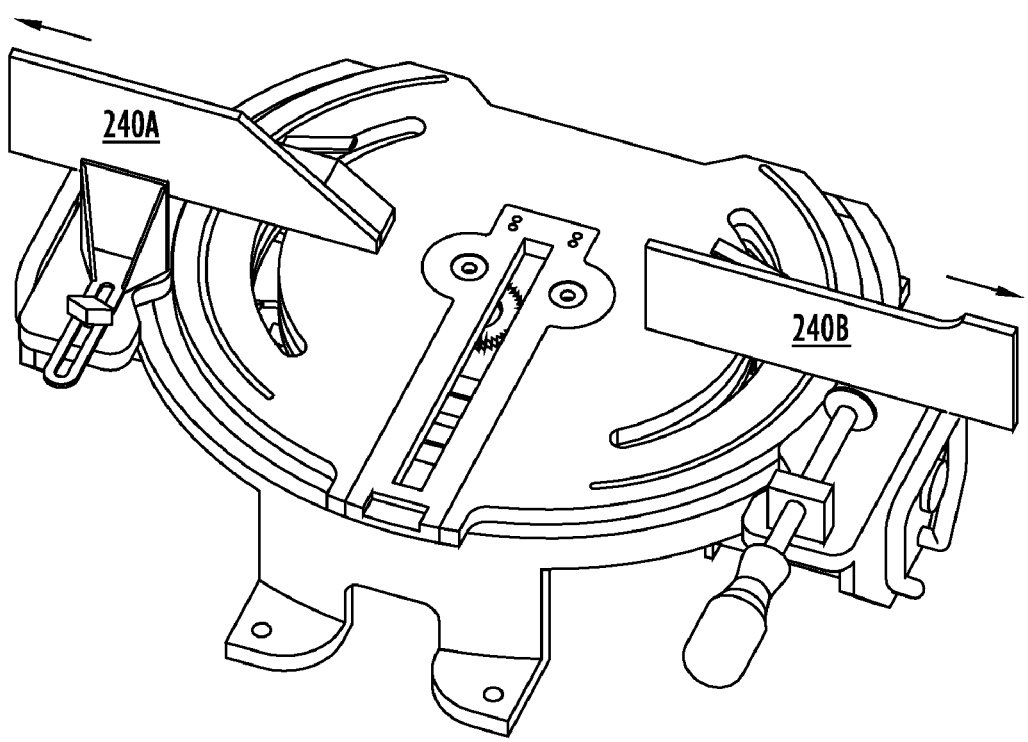

Each fence 240A, 240B, moreover, may be adapted to be laterally displaced along the surface of the deck 200. Referring to FIGS. 6A and 6B, each fence 240A, 240B may be a fixed to the deck 200 (via the fence support 217A, 217B) such that the fence moves from a first, inward position (FIG. 6A) to a second, extended position (FIG. 6B). This assists an operator in cutting a longer workpiece WP.

Figure 7:
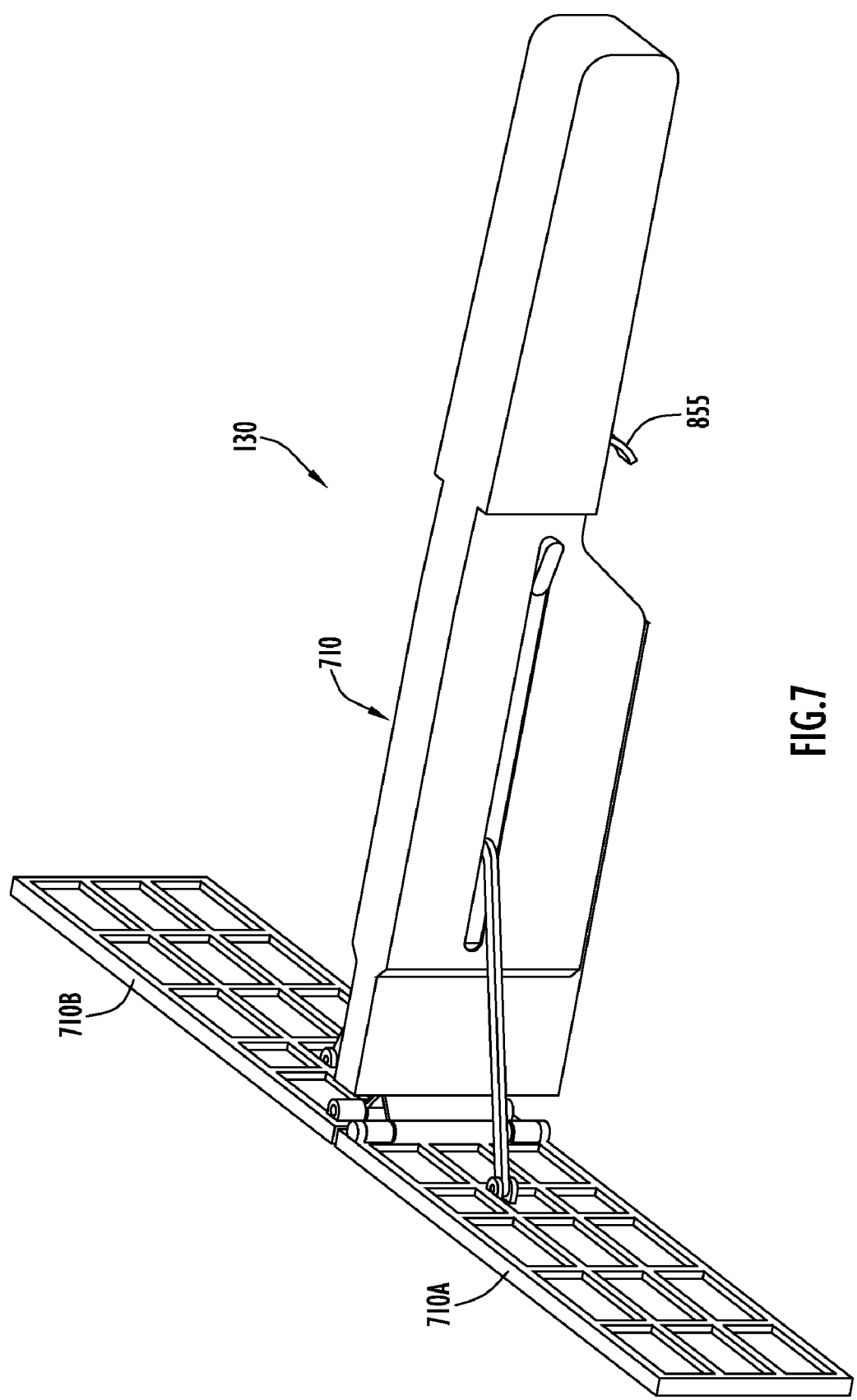
FIG. 7 illustrates a perspective view of the angle gauge of FIG. 1 in isolation.

The angle gauge 130 of the present invention is a device operable to measure the angle between two intersecting surfaces such as conjoined walls. FIG. 7 is a perspective view of the angle gauge 130 of FIG. 1 in isolation. In the illustrated embodiment, the angle gauge 130 includes a housing 710, a first plate or paddle 720A, and a second plate or paddle 720B. Each plate 720A, 720B is operable to rotate about an axis and move with respect to the housing 710. A tab may extend from the housing that is configured to connect to the notch 230 formed into the surface of the cutting deck 200, securing the angle gauge 130 to the base station 110.

Figure 8:
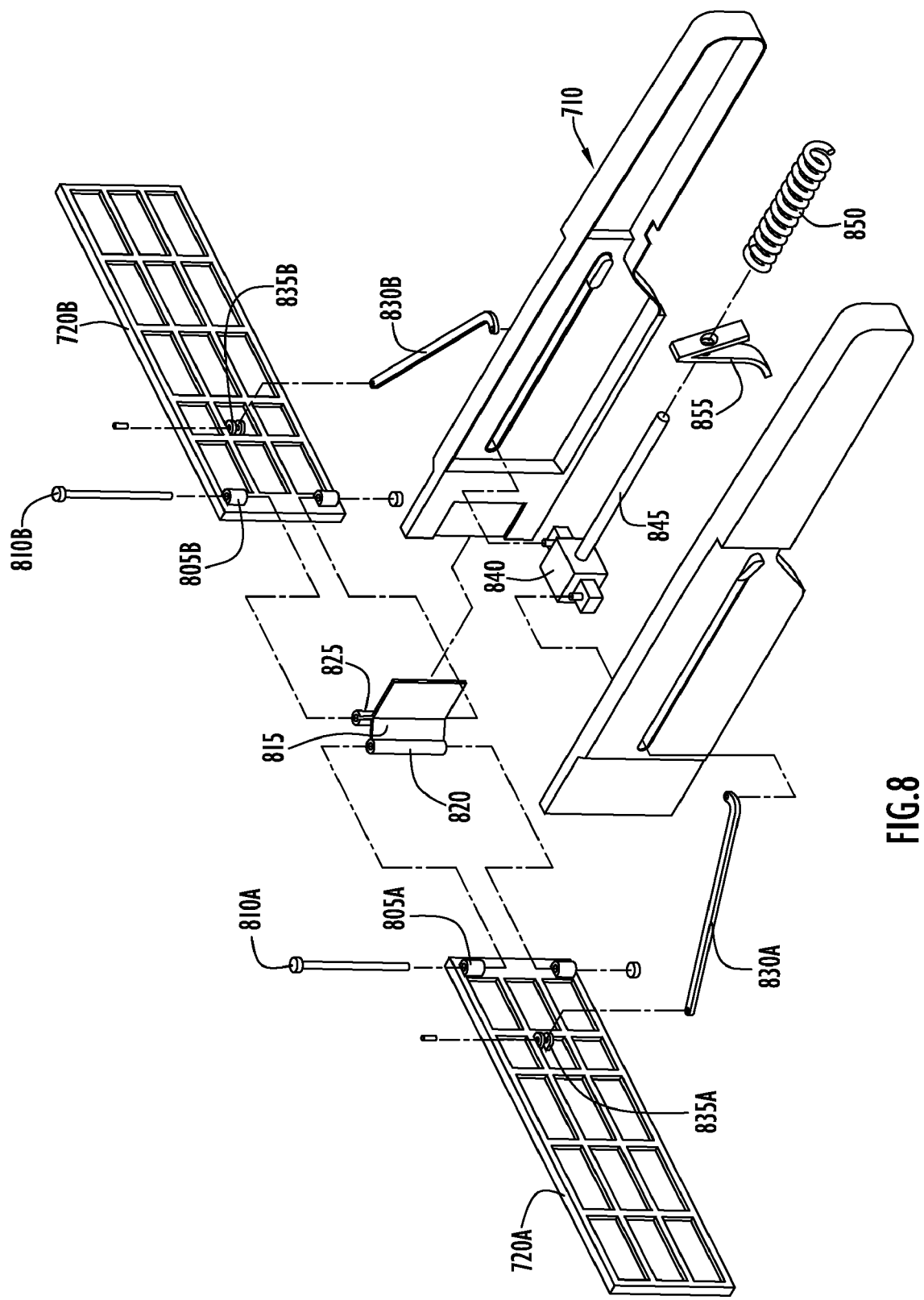
FIG. 8 illustrates an exploded view of the angle gauge shown in FIG. 7.

FIG. 8 is an exploded view of the angle gauge 130 of FIG. 7. In the embodiment illustrated, a first hinge 805A connects the first plate 720A to a first hinge pin 810A. Similarly, a second hinge 805B connects the second plate 720B to the hinge pin 810B. The hinge pin 810A, 810B may be secured to a plate pivot 815 via channels formed in the plate pivot 815. Specifically, the first hinge pin 810A is connected to a first channel 820 and second hinge pin 810B is connected to a second channel 825.

The first plate 720A and the second plate 720B pivot about an axis defined by their respective hinge pin 810A, 810B. The first plate 720A is connected to a first strut 830A, while the second plate 720B is connected to a second strut 830B. One end of each strut 830A, 830B connects to its associated plate 720A, 720B at a strut connection 835A, 835B, respectively. The opposite end of each strut 830A, 830B, furthermore, is pivotally connected to an actuator block 840. The actuator block 840 slides within the housing, and is connected to a stem or rod 845 biased via a biasing member 850 (e.g., a spring). The biasing member 850 drives stem 845 forward, toward the front of the housing 710 (i.e., in the direction of the plates 720A, 720B). An actuator or trigger 855 selectively engages and disengages the stem 845 to permit or prevent the biasing force of the stem to act upon the actuator block 840. Thus, in the engaged position, the trigger 855 locks the stem 845, preventing the movement of the stem within the housing 710. Conversely, engaging the trigger 855 releases the stem 845, permitting the movement of the stem 845 within the housing 710, driven by the biasing member 850. It is important to note that, while a trigger is illustrated, the actuator may include another mechanism such as depressible buttons, etc.

In operation, the stem 845 controls and limits the movement of the first and second plates 720A, 720B. Engaging the trigger 855 permits the biasing member 850 to drive the stem 845 toward the front of the housing 710. Movement of the stem 845, in turn, drives the actuator block 840 towards the front of the housing 710, causing a corresponding forward movement of the struts 830A, 830B. The strut movement rotates the plates 720A, 720B about their respective hinge pins 810A, 810B. Thus, the plates 720A, 720B may rotate from a first plate position (e.g., as shown in FIG. 9A) to a second plate position (e.g., as shown in FIG. 9B) (i.e., the forward strut movement drives the plates forward). The measured angle 900 is formed between the first plate 720A and the second plate 720B. The degree of plate rotation is not particularly limited to that which is illustrated herein. By way of example, each plate 720A, 720B may be adapted to pivot approximately 180° (90° clockwise and 90° counterclockwise) from a 0° reference point. Thus, the angle gauge 130 is capable of measuring acute angles, 90° angles, and obtuse angles.

The plates 720A, 720B are configured contact the corner of conjoined walls to perform a measurement. In operation, when the plates 720A, 720B abut intersecting surfaces (e.g., conjoined walls), the plates 720A, 720B pivot to match the angle between the wall surfaces, providing the direct measurement of the corner angle. In this manner, the angle gauge 130 may be used to measure an interior corner, as well as an exterior corner.

Figure 10A:
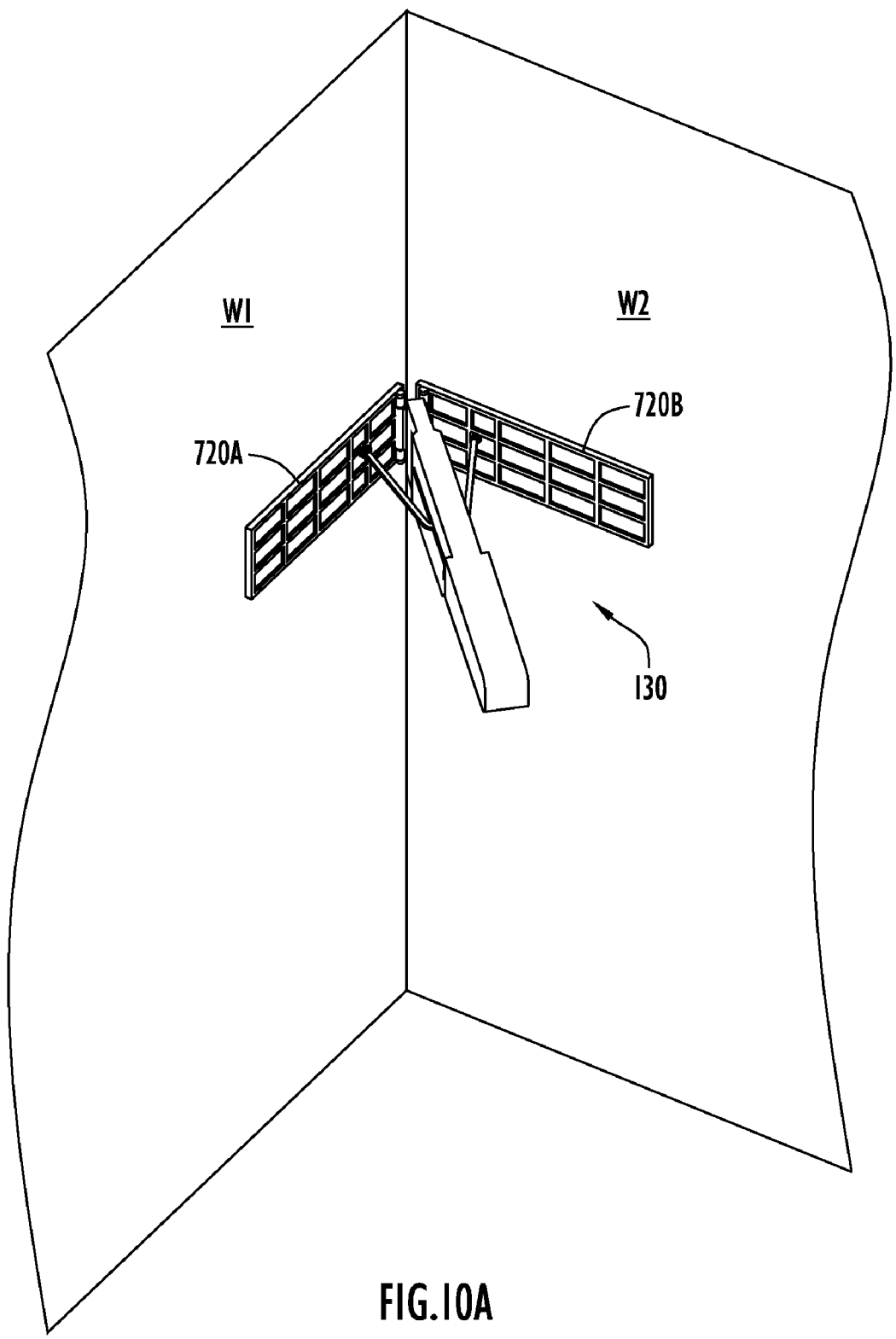

Operation of the system 100 for forming a miter joint is explained with reference to FIGS. 10A-10D. To measure the angle between a pair of conjoined walls W1 and W2, the plates are first rotated back against the housing 310. Specifically, the actuator 855 is engaged to release the stem 845 and the plates 720A, 720B are manually pushed back against the housing 710. The angle gauge 130 is positioned within the corner of the walls W1, W2. Using one-handed operation, the actuator 855 may be once again engaged to release the stem 845, permitting the biasing action of the spring to rotate of the plates 720A, 720B toward the walls W1, W2. The plates 720A, 720B are driven forward by the biasing member 850 (as described above) until the each plate contacts its respective wall W1, W2. That is, the plates 720A, 720B pivot about their respective hinge pin 810A, 810B until the front surface of each plate is in substantially continuous, tight contact with its respective wall W1, W2 (FIG. 10A). The position of the plates 720A, 720B provides a direct measurement of the angle existing between the walls W1, W2. Once the plates are in position, the actuator 855 is disengaged to secure the plates 720A, 720B at the measured angle 900.

Figure 10B:
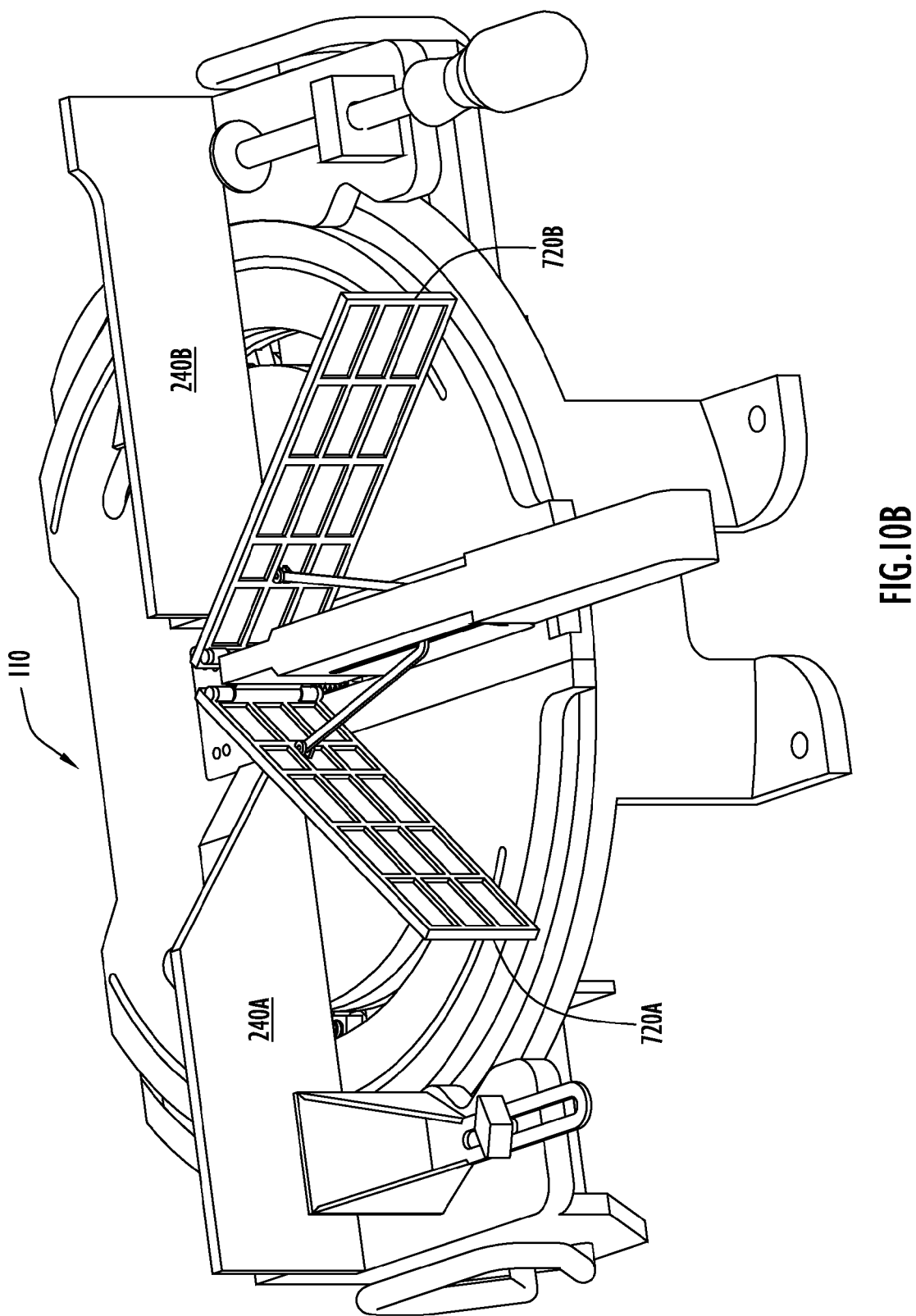

The angle gauge 130 may then be transferred to the base station 110. Referring to FIG. 10B, the angle gauge 130 is positioned on base station. The kerf slot 210 serves as a guide, orienting the angle gauge onto the deck 200 such that the angle measured by the plates 720A, 720B is bisected by the kerf slot. Each fence 240A, 240B is then moved along its associated rail (and thus its arcuate slot) as described above. The fences 240A, 240B are driven until the contact their respective plates 720A, 720B. The fine tune mechanism may be used to provide a continuous, tight contact between each fence and plate. Once in tight contact, the fences 240A, 240B are locked via clamp mechanism. In this manner, the measured angle 900 of the angle gauge 130 is transferred to the fences on the base station 110.

The angle gauge 130 is removed, and the workpiece WP is placed vertically against the fence (i.e., in the same manner the workpiece connects to its associated wall). Specifically, referring to FIG. 10D, a first workpiece WP (e.g., a board, molding, etc.) may then be placed against the first plate 720A such that an end of the first workpiece WP extends across the kerf slot 210 and, as such, in the path of the cutting tool blade. A user acts upon the first workpiece WP using the cutting tool 120. This resulting cut includes the miter angle directly measured from the first work surface/wall W1. Similarly, a second workpiece (not illustrated) may then be placed on the second plate 720B to cut the second workpiece. The angle of the resulting cut equals the miter angle associated with the second work surface/wall W2. The cut workpieces, when placed on their respective walls W1, W2, form a miter joint with exactly the same miter angles as the walls W1/W2.

The above system enables a user to take a direct measurement of an angle, and transfer that direct measurement to the fences of a table/miter saw. In contrast to conventional miter saws, the table does not have to be readjusted between the cutting of a first corner piece and the second corner piece. The system, then, eliminates the need to use a measuring device to calculate the angle, and then convert that measurement to the table saw. In addition, it simplifies the miter joint forming process by orienting each corner piece on the table saw in the same manner each corner piece is oriented on the wall.

With the above described rail system, the pivot point of the fence is located under the deck 200, leaving the cutting area open. This, in turn, allows long pieces of wood to project beyond the cutting area (and beyond the rear of the base station 110), permitting cuts to be performed regardless of the length of the workpiece. In addition, the rail/fence support system permits a workpiece to be cut in the same orientation it will assume when installed on a wall.

While the invention has been described in detail and with reference to specific embodiments thereof, it will be apparent to one skilled in the art that various changes and modifications can be made therein without departing from the spirit and scope thereof. For example, the base station 110, cutting tool 120, and measurement tool 130 may be of any size, possess any dimensions, and be formed from any suitable materials (e.g., wood, plastic, metal (aluminum), etc. The material from which the deck 200 is formed may include, but is not limited to, wood, composite material, metal (e.g., aluminum), plastic, etc. The dimensions of the deck 200 are not limited to that specifically depicted herein. The shape and dimensions of the fences 240A, 240B are not particularly limited to that which is illustrated herein, so long as they are capable of supporting a workpiece WP and orient it properly over the kerf slot 210. The clamp mechanism may be configured such that, when the lever 500 is in its up position, it interferes with placement of a workpiece WP on the fences and/or the path of the saw. This serves as a safety mechanism, preventing a user from using the saw/fences until they are secured in their locked position. The angle gauge 130 may possess any shape and dimensions suitable for its described purpose. The angle gauge 130 may further include an onboard calibration display that indicates the angle that was measured.

It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration. Thus, it is intended that the present invention covers the modifications and variations of this invention provided they come within the scope of the appended claims and their equivalents.

We claim:

1. A miter joint forming system comprising:
a miter saw including:
 a platform including a first surface and an opposed second surface, the platform including a peripheral edge,
 a cutting device coupled to the first surface of the platform,
 a kerf slot extending through the platform,
 a first generally arcuate slot extending through the platform and disposed in spaced relation from the kerf slot,
 a first fence slidably coupled to the first arcuate slot, wherein the first fence is configured to support a workpiece disposed on the first surface of the platform, and
 a second generally arcuate slot extending through the platform and disposed in spaced relation from the kerf slot,
 a second fence slidably coupled to the second arcuate slot, wherein the second fence is configured to support a workpiece disposed on the first surface of the platform,
 a first fence support member movably coupled to a first guide disposed along at least a portion of the platform peripheral edge, wherein the first fence support member moves along the first guide such that the first fence support member is repositionable with respect to the peripheral edge of the platform, the first fence extending from the platform to the first fence support member, and a second fence support member movably coupled to a second guide disposed along at least a portion of the platform peripheral edge, wherein the second fence support member moves along the second guide such that the second fence support member is repositionable with respect to the peripheral edge of the platform, the second fence extending from the platform to the second fence support member,
wherein each of the first and second fences is movably coupled to the platform to permit the displacement of the fence from a first platform position to a second platform position to selectively alter an angle at which the fence is oriented with respect to the kerf slot; and
a measurement tool configured to measure the angle between intersecting surfaces, the measurement tool comprising:
 a housing,
 a first measurement plate pivotally coupled to the housing such that the first measurement plate pivots about a pivot point,
 a second measurement plate pivotally coupled to the housing such that the second measurement plate pivots about a pivot point, wherein the measurement plates cooperate to define an angle therebetween,
wherein the measurement tool is configured to couple to the platform of the miter saw.

2. The miter joint forming system of claim 1, wherein the first measurement plate of the measurement tool pivots independently from the second measurement plate.

3. The miter joint forming system of claim 1, wherein:
the first measurement plate is laterally spaced from the second measurement plate about a vertical axis; and
the measurement plates are configured such that a space is maintained between the first measurement plate and the second measurement plate as the measurement plates pivot about their respective pivot points.

4. The miter joint forming system of claim 1, wherein:
the measurement tool further comprises:
 a rod that is longitudinally displaceable within the housing, and a first strut coupling the rod to the first measurement plate; and
longitudinal displacement of the rod within the housing pivots the first measurement plate from a first plate position to a second plate position.

5. The miter joint forming system of claim 4, wherein the measurement tool further comprises a second strut coupling the rod to the second measurement plate such that displacement of the rod within the housing further pivots the second measurement plate from a first plate position to a second plate position.

6. The miter joint forming system of claim 5, wherein:
the housing of the measurement tool further comprises a first elongated slot formed into the first lateral side and a second elongated slot formed into the second lateral side;
the first strut is driven by the rod along the first slot; and
the second strut is driven by the rod along the second slot.

7. The miter joint forming system of claim 1, wherein the measurement tool further comprises:
a first hinge plate extending distally from the housing, the first hinge plate including a first channel that receives a first pin configured to pivotally couple the first measurement plate to the first hinge plate; and
a second hinge plate extending distally from the housing, the second hinge plate including a second channel that receives a second pin configured to pivotally couple the second measurement plate to the second hinge plate.

8. The miter joint forming system of claim 7, wherein:
the housing of the measurement tool further comprises a front housing side and a rear housing side; and
the first and second hinge plates extend distally from the front side of the housing.

9. The miter joint forming system of claim 1, wherein the measurement tool further comprises a biasing member operable to bias the first and second measurement plates toward a normal position.

10. The miter joint forming system of claim 9, wherein the measurement tool further comprises an actuator operable to selectively secure the first and second measurement plates in a fixed position.

11. The miter joint forming system of claim 1, wherein the measurement tool further comprises a tab extending distally from the housing, the tab configured to couple the measurement tool to the platform of the miter saw.

12. The miter joint forming system of claim 11, wherein:
the platform of the miter saw further comprises a notch disposed along a perimeter of the platform and extending inboard from the perimeter;
the notch is aligned with the kerf slot; and
the notch is operable to receive the tab extending from the housing of the measurement tool.

13. The miter joint forming system of claim 1, wherein at least one of the first fence and the second fence is radially displaceable with respect to the platform to selectively alter a distance between the fence and the kerf slot.

14. The miter joint forming system of claim 1, wherein:
the measurement tool further comprises:
 a rod having a first end and a second end,
 an actuator block coupled to the rod second end, a biasing member configured to bias the rod toward a normal position, a first strut in communication with the actuator block, and a second strut in communication with the actuator block;

the first measurement plate is coupled to the first strut; and the second plate is coupled to the second strut, wherein translation of the actuator block repositions the first and second struts to alter the angle defined between the first measurement plate and the measurement second plate.

15. The miter joint forming system of claim 1, wherein at least one of the first fence and second fence is pivotally displaced via a displacement mechanism operable to selectively drive the fence from the first platform position to the second platform position.

16. The miter joint forming system of claim 1, wherein the miter saw further comprises:

a gear rack formed into the second surface of the platform; and a rotatable gear in meshed communication with the gear rack such that rotating the gear drives the first fence from the first platform position to the second platform position.

17. The miter joint forming system of claim 1, wherein the fence is securable in a stationary position via a fence lock mechanism comprising a coupling member configured to frictionally engage the platform and a lever configured to place the coupling member into frictional engagement with the platform.

18. The miter joint forming system of claim 1, wherein the miter saw further comprises:

an arcuate guide rail defined by a rib extending from the second surface of the platform and disposed proximate the first generally arcuate slot, and a shoe member coupled to the first fence, the shoe member engaging the guide rail such that the shoe member is permitted to slide along the guide rail.

19. The miter saw joint forming system of claim 18, wherein:

the miter saw further comprises:

a rod coupling the fence to the shoe member, wherein the rod extends from the first surface of the platform, through the kerf slot, and to the shoe member, and a lever configured to reorient the shoe member from a first, unlocked position, in which the shoe member is permitted to slide along the guide rail, to a second, locked position, in which the shoe member frictionally engages the guide rail such that the shoe member is not permitted to slide along the guide rail; and in the second, locked position, the displacement of the fence along the platform is prevented.

20. The miter joint forming system of claim 1, wherein:

the first fence is coupled to the first fence support member;

the second fence is coupled to the second fence support member; and movement of a fence support member generates corresponding movement in the fence associated with the fence support member.

21. The miter joint forming system of claim 1, wherein at least one of the first fence support member and the second fence support member includes an extension member configured to support a workpiece, the extension member being selectively extendable from the fence support member.

22. The miter joint forming system of claim 1, wherein each fence is selectively securable in a stationary position such that movement of the fence with respect to the platform is prevented.

23. The miter joint forming system of claim 1, wherein the miter saw further comprises a clamp operable to secure a workpiece against a fence.

* * * * *

UNITED STATES PATENT AND TRADEMARK OFFICE
CERTIFICATE OF CORRECTION

PATENT NO.        : 8,166,860 B2
APPLICATION NO.   : 12/848427
DATED             : May 1, 2012
INVENTOR(S)       : Gibbons et al.

It is certified that error appears in the above-identified patent and that said Letters Patent is hereby corrected as shown below:

Column 12, line 4, replace "miter saw joint" with -- miter joint --.

Signed and Sealed this
Third Day of July, 2012

David J. Kappos
*Director of the United States Patent and Trademark Office*